J. D. WILLIAMSON, Jr.
SYSTEM OF REMOTE CONTROL.
APPLICATION FILED FEB. 13, 1915.

1,171,291.

Patented Feb. 8, 1916.
4 SHEETS—SHEET 1.

Witnesses
Walter Chinn
Will A Burrows

Inventor
John D. Williamson, Jr.
by his Attorneys
Howson & Howson

J. D. WILLIAMSON, Jr.
SYSTEM OF REMOTE CONTROL.
APPLICATION FILED FEB. 13, 1915.

1,171,291.

Patented Feb. 8, 1916.
4 SHEETS—SHEET 2.

Witnesses

Inventor
John D. Williamson, Jr.
by his Attorneys

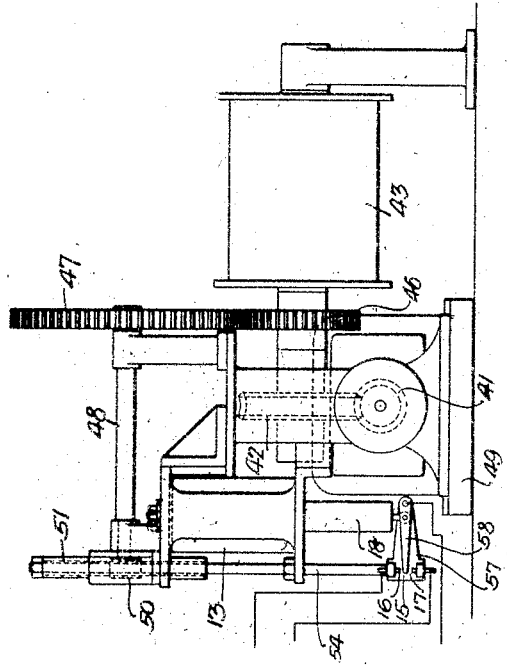

UNITED STATES PATENT OFFICE.

JOHN D. WILLIAMSON, JR., OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

SYSTEM OF REMOTE CONTROL.

1,171,291.  Specification of Letters Patent.  Patented Feb. 8, 1916.

Application filed February 13, 1915. Serial No. 7,991.

*To all whom it may concern:*

Be it known that I, JOHN D. WILLIAMSON, Jr., a citizen of the United States, residing in Philadelphia, Pennsylvania, have invented a System of Remote Control, of which the following is a specification.

One object of my invention is to provide a relatively simple apparatus for controlling the operation of a motor at a distance and more particularly the rudder operating motor of an electrical steering system or of a motor for controlling the operation of an engine, the invention contemplating an arrangement of parts whereby this motor may be caused to move the rudder or other member to be controlled into any desired position corresponding to that of a steering wheel or operating member.

A further object of the invention is to provide a system having the above characteristics which shall require a relatively small number of wires between the steering wheel or controlling member and those parts of the apparatus immediately associated with the rudder, it being also desired to provide a novel form of floating gear whereby as the rudder is being brought to a desired position, certain parts are gradually moved so as to ultimately prevent further movement of the actuating motor when the rudder has reached the predetermined point.

I further desire to provide a novel form of relay apparatus for governing the operation of the rudder actuating motor of an electrical steering gear.

Figure 1:
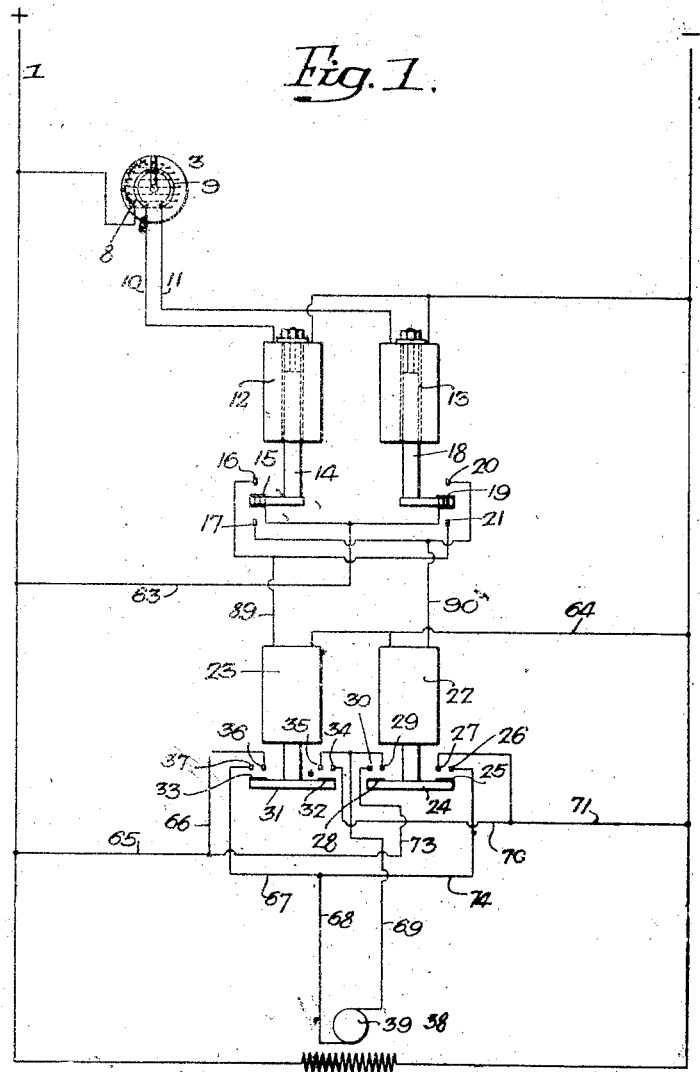
Figure 6:
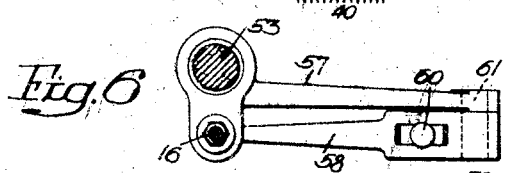
Figure 7:
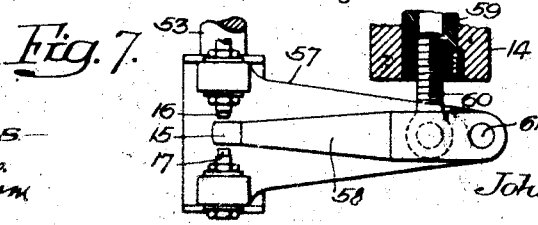
Figure 2:
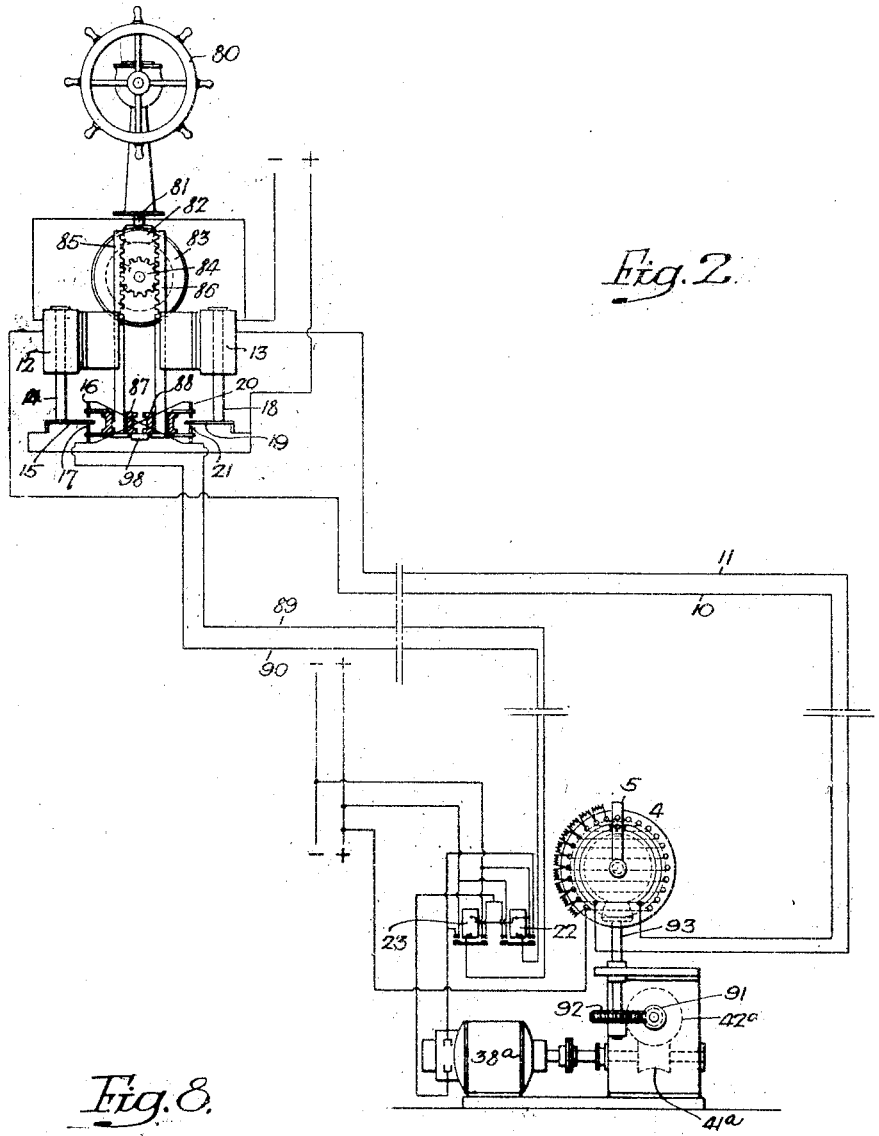
Figure 8:
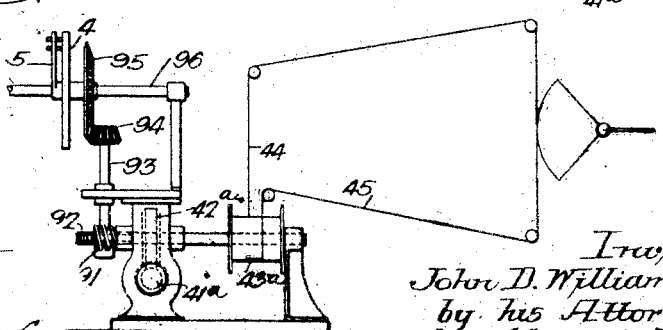
Figure 3:
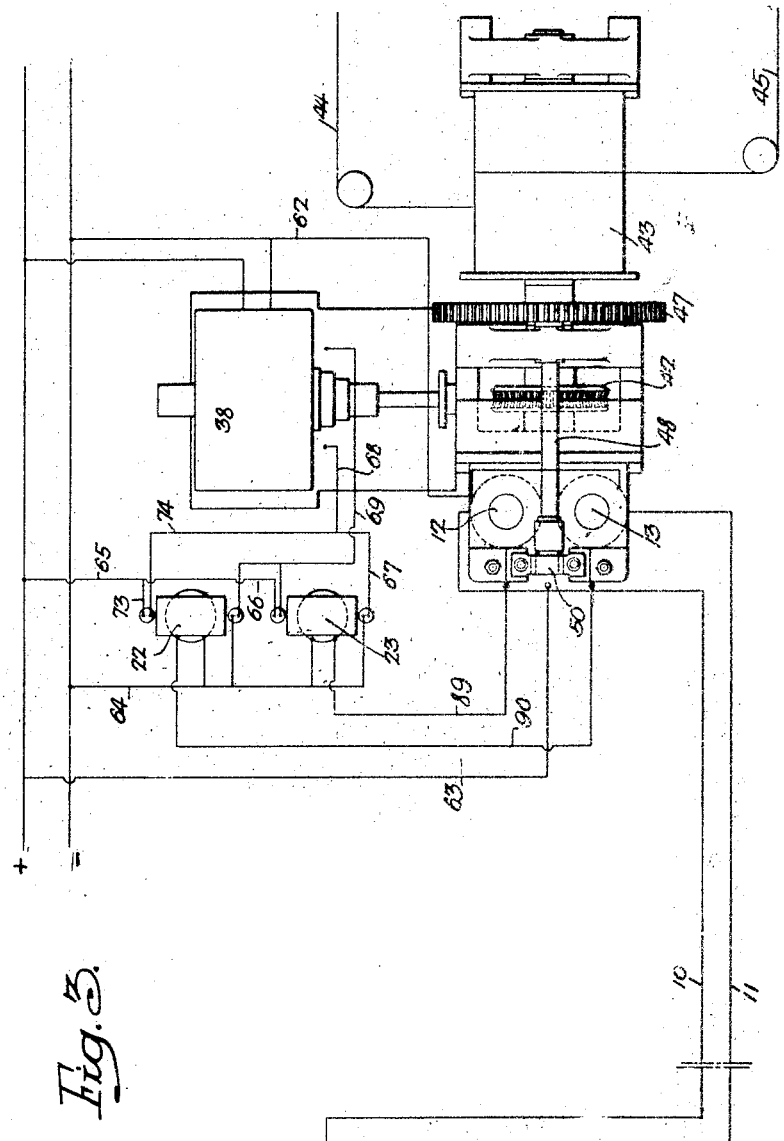

These objects and other advantageous ends I secure as hereinafter set forth, reference being had to the accompanying drawings in which, Figures 1 and 2 are diagrammatic views illustrating the apparatus comprising two forms of my invention; Fig. 3 is a plan, to some extent diagrammatic, further illustrating the apparatus utilized in the system shown in Fig. 1. Figs. 4 and 5 are respectively a front and a side elevation of the floating gear shown in plan in Fig. 3; Figs. 6 and 7 are a plan and a side elevation, both partly in section, illustrating the preferred construction of certain of the switches forming part of my invention; and Fig. 8 is a side elevation, to some extent diagrammatic, illustrating certain of the mechanism shown in Fig. 2.

In the above drawings, the current supply mains are indicated at 1 and 2 and to the first of these is connected a controlling rheostat 3 which includes a supporting plate 4, an operating handle 5 and two series of contact points 6. Between the points of one series are connected banks of resistance 7 and these points are cross connected with the correspondingly placed points of the second series. Both sets of points are mounted on a circle concentric with the pivotal point of the handle 5 with which are also concentric two contact segments in the form of strips 8 and 9 so placed that when the handle is in its vertical or off position, its bridging contact engages neither of the segments 8 and 9 nor any of the points 6.

From the segments 8 and 9 two conductors 10 and 11 run respectively to a pair of electro-magnets in the form of solenoids 12 and 13, whose second terminals are connected together and to the negative supply main 2, it being understood that while the controlling rheostat 3 is placed at any desired point, the solenoids 12 and 13, together with the other apparatus hereafter described, are mounted immediately adjacent or in the vicinity of the rudder, or other member to be controlled so that the conductors 10 and 11 constitute the sole connection between these two sets of apparatus.

The solenoid 12 is provided with a core 14 carrying a contact 15 permanently connected to the positive supply main and capable of being brought into electrical engagement with either of two fixed contacts 16 and 17. Similarly the solenoid 13 has a core 18 which carries a contact 19 capable of being moved into engagement with either of two contacts 20 and 21. While said contact 19 is connected to the positive supply main, the upper fixed contact 20 with the lower fixed contact 17 is connected to one terminal of a solenoid 22 whose second terminal is connected to the negative supply main. The upper fixed contact 16 of the solenoid 12, with the lower fixed contact 21 of the solenoid 13, is connected to one terminal of a second solenoid 23 whose other terminal is likewise connected to the negative supply main. Each of these latter solenoids 22 and 23 has its core connected to a member carrying two electrically insulated contact plates of which the plate 24 controlled by the solenoid 22 has one of its contacts 25 capable of electrically connecting two fixed contacts 26 and 27 while its other contact 28 is similarly connected to two other fixed contacts 29 and 30. The plate 31 connected to the core of the solenoid 23 likewise carries two contact members 32 and 33 of which the first is capable of connecting two fixed contacts 34 and 35 when the solenoid is energized, at which time the member 33 will likewise connect the two other fixed contacts 36 and 37. The rudder in this case is actuated by a motor 38 whose field winding 40 may be connected directly between the supply mains 1 and 2 while its armature 39 has one terminal connected to the contacts 26 and 37 and its second terminal connected to the contacts 29 and 35. The fixed contacts 30 and 36 are both connected to the positive supply main while the contacts 27 and 34 are similarly connected to the negative supply main.

In the particular case illustrated the motor 38 is shown as driving a worm 41 which, through a worm wheel 42, actuates a drum 43 having mounted upon it the cables 44 and 45 leading to the tiller. The shaft on which both the worm wheel 42 and the drum 43 are mounted likewise has fixed to it a gear 46 meshing with a gear 47 fixed to a shaft 48, this latter being mounted in suitable bearings provided by the general frame work 49 on which the worm and worm wheel with their associated parts are also supported. The shaft 48 in addition to the gear wheel 47, has fixed to it a pinion 50, so mounted as to mesh with two oppositely placed racks 51 and 52 slidably guided in the front portion of the frame 49. Said racks are made tubular for the reception of a pair of vertically movable rods 53 and 54 each of which at its upper end is provided with a nut whereby it may be raised or held from dropping by its particular rack. In addition each of these rods has mounted on it a nut 55 placed to engage a cross bar 56 on the frame after the rod to which it belongs has been lowered a predetermined distance and each rod has fixed to its lower end an arm 57 projecting at right angles to its center line as indicated in Figs. 6 and 7. At the outer extremity of each of these arms is pivoted a movable switch member 58 whose free extremity is capable of engaging either of the two contacts 16—17 or 20—21, as the case may be, when actuated by the core 14 or 18 of one of the solenoids 12 or 13. For the purpose of connecting said core with the switch member or arm 58, I mount in its lower end an insulating bushing 59 and screw into this the threaded end of an eyebolt 60 whose opposite end is pivoted or otherwise loosely connected to said member 58 adjacent its pivotal point 61.

With the above described arrangement of parts, a movement of the operating handle 5 of the rheostat 3 to the left for example, will permit a current of definite quantity to flow from the positive supply main to the solenoid 12, from whence a circuit is complete through the conductor 62 to the negative current main. The resulting energization of this solenoid at once raises its core 14 to a point dependent upon the current strength, it being understood that the proportions of the solenoids and the current used are such as to cause the solenoids to be unsaturated under operating conditions. This upward movement of the core 14 causes the switch arm 58 to be first moved into engagement with the contact 16 of the arm 57 carried by the rod 53 and thereafter causes raising of this rod through and independently of its rack 52.

The completion of the circuit between the arm 58 and this contact permits current to flow from the positive supply main through the conductor 63, to the contact 15 carried by the arm 58, thence to the contact 16, solenoid 23 and conductor 64 to the negative supply line. The immediate raising of the core of this latter solenoid causes the completion of the armature circuit of the motor from the positive supply main through the conductors 65 and 66, contacts 36, 33 and 37, conductors 67 and 68, and armature 39. From the latter the current flows through the conductor 69, the contacts 35, 32 and 34, thence through the conductors 70 and 71 to the negative supply main.

As the field winding 40 of the motor is constantly energized, the motor at once starts and returns the worm 41, worm wheel 42 and cable drum 43 in a definite direction, causing operation of the rudder through one or the other of the cables 44 or 45 from its amidships position. Its direction of movement is such however, that through the gears 46 and 47, shaft 48 and pinion 50, the rack 52 is raised and the rack 51 lowered, so that while this latter rack has no effect upon its rod 54 which is merely supported by the nut 55, the rack 52 follows up the rod 53, until the continued operation of the motor finally brings it into engagement with the nut at the top of said rod. The latter is then raised with the rack until the contact 16 is moved away from the contact 15 on the arm 58, it being noted that said arm is maintained in a definite position by the solenoid core 14. This breaking of the circuit of the solenoid 23 at once permits its core with its plate to drop, open circuiting the motor 38 and causing the rudder to remain in the position to which it had been brought, which position corresponds to that to which the operating handle 5 was originally moved by the steersman. At this time no part of the system is receiving current except the solenoid 12.

If now that arm 5 is moved farther to the left, more of the resistance 7 is cut out of circuit, a larger current flows to the solenoid and the core 14 is raised higher. At once the arm 58 is moved to bring its contact 15 into engagement with the contact 16, thereby energizing the solenoid 23 and again starting the motor 38 which operates until the rack 52 is again followed by the rod for sufficient distance to cause breakage of the circuit of the solenoid 23 at the contacts 15 and 16. The rudder is thus brought to and held in a new position which again corresponds to that of the operating handle. If the operating arm 5 be moved to its neutral position and beyond the same into engagement with the segment 9, the solenoid 12 is at once deënergized so that its core 14 drops and causes engagement of the contacts 15 and 17, at the same time that curernt is allowed to flow in definite amount through the conductor 11 to the solenoid 13 which at once raises its core 18 and with it the rod 54 to a definite height. In this case the resulting engagement of the contacts 19 and 20 as well as the engagement of the contacts 15 and 17 controlled by the deënergized solenoid 12, allows current to flow to the solenoid 22. The raising of the core of said solenoid completes the armature circuit but in such manner that the current flows from the positive supply main to the conductors 65 and 73, contacts, 30, 28 and 29, and conductor 69 to the armature, from whence it flows through conductors 68 and 74, contacts 26, 25 and 27, to the contact 71 and the negative supply main 2. Obviously therefore, the armature turns in a direction opposite to that previously indicated and the rack 52 is lowered by power transmitted from the cable drum shaft through gears 46 and 47, shaft 48 and pinion 50. When the rudder reaches the amidships position the rack 52 has so far lowered its rod 53 as to cause separation of its contacts 15 and 17, but this does not affect the solenoid 22 whose circuit is still closed through the contacts 19 and 20. The motor therefore continues its operation past the amidships position until the pinion 50 causes the rack 51 to so far follow up the nut at the upper end of the rod 54 as to separate the contacts 19 and 20, whereupon the solenoid 22 is at once deënergized and the motor brought to rest with the rudder in a position corresponding to the angular displacement of the operating handle 5 from its off position. In this case the solenoid 13 continues to be supplied with current, although if the operating handle be moved to and allowed to remain in its mid position (Fig. 3) the deënergization of said solenoid causes its core 18 to drop, thereby completing the circuit of the solenoid 23 from the positive supply main through the conductor 63, contacts 19 and 21, through the windings of this solenoid and conductor 64 to the negative supply main. The consequent completion of the armature circuit of the motor will therefore cause the operation of the latter until the rack 51 has been so far lowered by the pinion 50 as to allow the contact 21 to disengage the contact 19, whereupon the circuit of the solenoid 23 and of the motor armature are broken, at which time the rudder is in its amidships position.

The number of the contact points 6 and the amount of the resistance 7 are so proportioned that the cores 14 and 18 of the two solenoids 12 and 13 will occupy a definite position for every point on the plate 4, while the remainder of the apparatus is so designed that the rudder is brought by the operation of the motor, to an angular position depending solely upon the position of the handle 5, it being especially noted that this desired end is obtained by comparatively uncomplicated apparatus requiring but a single pair of control wires leading from the pilot house or other point at which the controlling rheostat 3 is mounted, to the immediate vicinity of the rudder operating machinery. With this arrangement the connection with the positive supply main may be made from the feed wires of a lighting circuit so that no additional conductor is required.

If it be desired that visible indication be given in the pilot house or adjacent the steering wheel, as to when the rudder has reached a position corresponding to that of the steering wheel or operating handle, I may arrange the various parts of my system as indicated in Fig. 2, in which case, four instead of two wires are required between the rudder actuating apparatus and said wheel or handle. In this case the steering wheel 80 is connected through beveled gearing to a shaft 81 carrying a beveled pinion 82 meshing with a beveled gear wheel 83 mounted on a shaft which also has fixed to it a spur gear 84. Opposite sides of this latter are engaged by a pair of vertically guided racks 85 and 86 forming part of rods whose lower ends are headed and pass loosely through collars 87 and 88 preferably of insulating material. The first of these collars carries the contacts 16 and 17 while the second carries the contacts 20 and 21, and of these the first pair coacts with the contact 15 carried by the core 14 of the solenoid 12 and those of the second coöperate with the contact 19 carried on the core 18 of the solenoid 13. With this arrangement of parts the rheostat 3 is mounted immediately adjacent the rudder operating mechanism, while the two solenoids 12 and 13 and their associated parts are, as shown, mounted in the immediate vicinity of the steering wheel. There are therefore, two wires 89 and 90 in addition to the wires 10 and 11, which extend between the rudder operating mechanism and the pilot house, and as before the solenoids 12 and 13 control the energization of the solenoids 22 and 23 which likewise govern the supply of current to the armature 38ª. The tiller cables 44 and 45 in this instance run from a drum 43ª driven from the motor through a worm 41ª, and worm wheel 42ª, although the drum shaft is connected through a second worm 91, a worm wheel 92, shaft 93 and beveled gears 94 and 95 to the shaft or spindle 96 on which is mounted the operating arm of the rheostat 3. When therefore the steering wheel 80 is turned from its mid position, one of the racks 85 is raised and the other is lowered, with the result that while the latter does not affect its bushing 88 since this is supported upon a strip 98, the collar 87 is raised, thus bringing the contacts 15 and 17 into engagement and thereafter raising the core 14 of the solenoid. As a consequence of this the solenoid 23 is energized, the motor is started, and the rudder is turned, the gearing between the motor shaft and the operating handle 5 of the rheostat turning the latter from its mid or off position until finally such a current flows from the positive supply main through the conductor 10 that the solenoid 12 draws up its core 14 to such a height as to cause the contact 15 to disengage the contact 17, whereupon the solenoid 23 and the motor 38ª are open circuited as before explained. Since this action of the solenoid 12 does not take place until the rudder occupies the position desired, the rising and ultimate coming to rest of the core 14 furnishes to the steersman a visible indication that the required movement of said rudder has been completed.

If it be desired to thereafter bring the rudder into a position nearer amidships, the rack 85 is lowered independently of the core 14 of the solenoid 12 and when the arm 5 of the rheostat has been turned by the operation of the motor so far toward its vertical or off position that the current flow to the solenoid reaches such a point as to allow the core 14 to drop out of engagement with the contact 16, the motor is brought to rest as before.

From the above description it will be noted, that while in one case the operation of the motor and hence of the rudder, results, when the rudder occupies a predetermined position, in the automatic separation of contacts previously brought together as the result of the energization of an electromagnet controlled by a hand operated rheostat, in the second case such operation is caused by the hand controlled closure of a pair of contacts governing the energization of the solenoids belonging to the motor reversing switch, the arrangement being such that by the time the rudder occupies the desired position, said rheostat has been moved by the motor to a position in which the hand closed contacts are separated because of the resulting energization of the solenoid controlling them. In other words, in one case the rheostat is moved by hand and the main controlling contacts are separated by operation of the motor, while in the other case the rheostat is operated by the motor and the contacts are controlled by hand.

It is particularly to be noted that while I have illustrated my invention as designed for use in controlling the operation of a rudder actuating motor, said invention is equally well adapted to control the valve mechanism of the fuel supply of a steam or internal combustion engine and while I have shown the field winding of the motor 38 permanently connected across the supply mains as would be the use if said motor is of relatively small power, it will be understood that when a large motor is to be operated or controlled, the reversing switch would be connected to govern the standard or other switch mechanism commonly used in such cases.

While in Figs. 6 and 7 I have shown one form of contactor, it will be understood that without departing from my invention any other suitable switch may be used.

I claim:—

1. The combination of a motor; a reversing switch therefor; two electro-magnets for governing the operation of said switch; a pair of contacts connected to control the energization of said electro-magnets and movable by the motor; a third electro-magnet; a contact operative by the movable member of said electro-magnet into engagement with one or the other of said first contacts; and a switch for controlling energization of the third electro-magnet.

2. The combination of a motor; reversing means therefor; a solenoid having a movable member controlling said reversing means; current varying means in circuit with the solenoid winding for governing the position of said movable member; with a device other than said current varying means for mechanically shifting the position of said movable member.

3. The combination of a motor; reversing means therefor; two solenoids having movable members controlling said reversing means; gearing connecting said members; a current varying device governing the flow of current to the solenoid windings for adjusting the positions of their movable members; and means for manually actuating the gearing connecting the movable solenoid members for also controlling the positions of the same.

4. The combination of a motor; a reversing switch therefor; two solenoids for controlling said switch; a rheostat for governing the flow of current to the solenoid windings and determining the positions of their movable members; means for mechanically actuating the movable members of the solenoids; with floating mechanism actuated by the motor for operating one of the two elements comprised by said means and the rheostat, the other of said elements being manually controlled.

5. The combination of a motor; an electro-magnetic reversing switch therefor; two electro-magnets governing the operation of said switch and each having means for operating it to cause operation of the motor in either direction; means for varying the current flow to said electro-magnets to adjust the positions of their movable members; and mechanism for adjusting said members.

6. Motor controlling apparatus consisting of a solenoid having a core; a contact carried by the core; two coöperating contacts on opposite sides of the core-contact; a structure supporting said later contacts; means for varying the current flow to the solenoid to vary the position of the core; with apparatus in circuit with said contacts connected to cause said contact carrying structure to follow up the core and ultimately cause separation of one or the other of its contacts from the core carried contact.

7. The combination of a solenoid having a core; current varying means in circuit with the solenoid winding for governing the position of the core; a movable structure adjacent the solenoid; coöperating switch contacts respectively connected to the core and to said structure; a motor governed by the switch provided by said contacts; with mechanism connecting the motor with the movable structure for causing the same to follow up the solenoid core and cause disengagement of the contacts after the motor has been operated to a predetermined extent.

8. The combination of a motor; a reversing switch therefor; electro-magnetic controlling means for said switch; floating gear for causing the motor to automatically open its switch after it has operated for a predetermined time; and a current varying device remote from the controlling means for governing the current flow to the same to vary the time of operation of the motor.

9. The combination of a motor; a reversing switch therefor; electro-magnetic controlling means for said switch; floating gear for causing the motor to automatically open its switch after it has operated for a predetermined time; and a current varying device remote from the controlling means for varying the time the motor is in operation; with two conductors forming the sole connection between said device and the controlling means.

10. The combination of a motor; a reversing switch therefor; two electro-magnets for controlling said reversing switch; two other electro-magnets for governing the operation of the reversing switch magnets and including movable switch governing members; floating gear connecting the motor with said members; and manually operated current varying means in circuit with the windings of said second pair of electro-magnets for primarily adjusting their movable members to definite points.

11. The combination of a motor; a reversing switch therefor including two electro-magnets; two other electro-magnets having movable switch members connected to govern the energization of the reversing switch magnets; manually operated means for causing either of said members to assume any of a number of different positions in which the circuit of one of the reversing switch magnets is closed; with follow-up gear actuated by the motor and connected to the members of said second pair of magnets for causing opening of the switches controlled thereby and deënergization of the reversing switch magnets after the motor has operated for a predetermined time.

12. The combination of a motor; a reversing switch therefor; two electro-magnets for governing the operation of said switch; a pair of contacts connected to control the energization of said electro-magnets and movable by the motor; a solenoid; a contact operative by the movable member of said solenoid into engagement with either of said first contacts; and a current varying device for controlling the position of said movable member.

In testimony whereof, I have signed my name to this specification, in the presence of two subscribing witnesses.

JOHN D. WILLIAMSON, Jr.

Witnesses:
WILLIAM E. BRADLEY,
WM. A. BARR.